United States Patent
Tamaki et al.

(10) Patent No.: US 12,261,477 B2
(45) Date of Patent: Mar. 25, 2025

(54) BACKUP POWER SUPPLY DEVICE AND METHOD FOR CONTROLLING BACKUP POWER SUPPLY DEVICE

(71) Applicant: FDK CORPORATION, Tokyo (JP)

(72) Inventors: Katsuhiko Tamaki, Tokyo (JP); Yasuyuki Katsube, Tokyo (JP); Naoaki Konda, Tokyo (JP)

(73) Assignee: FDX CORPORATION, Tokyo (JP)

( * ) Notice: Subject to any disclaimer, the term of this patent is extended or adjusted under 35 U.S.C. 154(b) by 53 days.

(21) Appl. No.: 18/002,854

(22) PCT Filed: Apr. 26, 2021

(86) PCT No.: PCT/JP2021/016585
§ 371 (c)(1),
(2) Date: Dec. 21, 2022

(87) PCT Pub. No.: WO2022/004109
PCT Pub. Date: Jan. 6, 2022

(65) Prior Publication Data
US 2023/0246478 A1 Aug. 3, 2023

(30) Foreign Application Priority Data
Jun. 29, 2020 (JP) .................. 2020-112189

(51) Int. Cl.
*H02J 9/06* (2006.01)
*H02J 7/00* (2006.01)

(52) U.S. Cl.
CPC .............. *H02J 9/06* (2013.01); *H02J 7/0063* (2013.01); *H02J 7/007182* (2020.01)

(58) Field of Classification Search
CPC ....... H02J 9/06; H02J 7/007182; H02J 7/0063
(Continued)

(56) References Cited

U.S. PATENT DOCUMENTS 6,121,694 A 9/2000 Thereze
6,175,511 B1 * 1/2001 Ooba .................. H02M 3/1582
363/124
(Continued)

FOREIGN PATENT DOCUMENTS

JP S6412821 A 1/1989
JP 2001186689 A 7/2001
(Continued)

OTHER PUBLICATIONS

International Search Report dated Jul. 20, 2021, for corresponding PCT Application No. PCT/JP2021/016585.
(Continued)

*Primary Examiner* — Michael R. Fin
(74) *Attorney, Agent, or Firm* — Kinney & Lange, P.A.

(57) ABSTRACT

Provided is a backup power supply that efficiently supplies power under the control of a microcomputer. The backup power supply is charged by a rectifier for generating power of a predetermined voltage, and supplies power to a load device operating with power supplied from the rectifier when the supplied power is insufficient. The backup power supply includes a secondary battery to be charged with power from the rectifier, a control unit for controlling charging and discharging of the secondary battery, and an input/output voltage detection unit for detecting the output voltage from the rectifier. The control unit stops charging of the secondary battery or reduces a charging current flow of the secondary battery when the output voltage drops to a first threshold voltage or less.

10 Claims, 5 Drawing Sheets

(58) Field of Classification Search
USPC .......................................................... 307/64
See application file for complete search history.

(56) References Cited

U.S. PATENT DOCUMENTS

| | | | | |
|---|---|---|---|---|
| 7,872,450 B1* | 1/2011 | Cohen | ................... | H02J 7/0068 |
| | | | | 320/160 |
| 2015/0076916 A1* | 3/2015 | Cheng | ................. | H02M 5/4585 |
| | | | | 307/64 |
| 2017/0366043 A1 | 12/2017 | Tu et al. | | |

FOREIGN PATENT DOCUMENTS

| | | | |
|---|---|---|---|
| JP | 2003052134 A | 2/2003 | |
| JP | 2007209056 A | 8/2007 | |

OTHER PUBLICATIONS

Extended European Search Report dated May 24, 2024, for corresponding European Application No. 21833954.7.
Partial Supplementary European Search Report dated Feb. 21, 2024, for corresponding European Application No. 21833954.7.

* cited by examiner

BACKUP POWER SUPPLY DEVICE AND METHOD FOR CONTROLLING BACKUP POWER SUPPLY DEVICE

CROSS-REFERENCE TO RELATED APPLICATION(S)

This application is the national phase of PCT Application No. PCT/JP2021/016585 filed on Apr. 26, 2021, which claims priority to Japanese Application No. 2020-112189 filed on Jun. 29, 2020, the contents of which are incorporated herein by reference in their entirety.

BACKGROUND

Technical Field

The present disclosure relates to a backup power supply and a method for controlling the backup power supply.

Background Art

Conventionally, combination of a rechargeable battery and a rectifier has been used in fields requiring backup devices using rechargeable batteries. Further, lead batteries have been widely used as rechargeable batteries.

When a rectifier has no room in the allowable power thereof and a larger amount of current flows instantaneously through a load device, the rectifier may be overloaded, which reduces the output voltage of the rectifier instantaneously. When the output voltage of the rectifier drops due to overload, it may be detected as a trouble of the load device or occurrence of a low voltage in a crossing gate.

Therefore, when the output power of the rectifier drops, a lead battery is electrically connected to the load device and discharges to the load device, thereby continuing the operation of the load device.

SUMMARY

In recent years, there has been a tendency to use, as a backup power supply, a light-weight, compact, and long-life battery instead of a lead battery. Further, such a battery is equipped with a control board in order to perform highly functional control, and requires control using a microcomputer or the like.

An object of the present disclosure is to provide a backup power supply and a method for controlling the same that perform efficient power supply under the control of a microcomputer.

In order to achieve the above object, according to a first aspect of the present disclosure, the disclosure is characterized by a backup power supply to be charged by a rectifier for generating power of a predetermined voltage, the backup power supply suppling power to a load device operated with power supplied from the rectifier, when the power supplied from the rectifier to the load device is insufficient, comprising: a secondary battery configured to be charged with power from the rectifier; a control unit configured to control charging and discharging of the secondary battery; and an output voltage detection unit configured to detect an output voltage from the rectifier. When the output voltage drops to or below a first threshold voltage lower than the predetermined voltage, the control unit performs at least one of reducing a charging current for charging the secondary battery and stopping charging of the secondary battery.

According to a second aspect of the present disclosure, the disclosure is characterized by a backup power supply charged by a rectifier for suppling power to a load device operated with power supplied from the rectifier outputting power of a predetermined voltage, when the power supplied from the rectifier to the load device is insufficient, comprising: a secondary battery configured to be charged with power from the rectifier; a control unit configured to control charging and discharging of the secondary battery; an output voltage detection unit for detecting an output voltage from the rectifier; and a battery voltage detection unit for detecting a battery voltage across the secondary battery. When the output voltage drops to or below a third threshold voltage lower than the predetermined voltage and the output voltage is lower than the battery voltage, the control unit allows the secondary battery to discharge to the load device during a first time period. When the output voltage returns to the predetermined voltage after elapse of the first time period, the control unit stops discharge from the secondary battery to the load device.

According to a third aspect of the present disclosure, the disclosure is characterized by a method for controlling a backup power supply for suppling power to a load device operated with power supplied from a rectifier outputting power of a predetermined voltage, when the power supplied from the rectifier to the load device is insufficient. The method includes: charging the backup power supply by the rectifier; and stopping charging of the backup power supply when an output voltage from the rectifier drops to or below a first threshold voltage lower than the predetermined voltage.

According to a fourth aspect of the present disclosure, the disclosure is characterized by a method for controlling a backup power supply charged by a rectifier for supplying power to a load device operated with power supplied from the rectifier when the power supplied from the rectifier to the load device is insufficient, the rectifier outputting power of a predetermined voltage. The method includes: supplying power from the backup power supply to the load device over a first period of time on a condition that an output voltage of the backup power supply is higher than an output voltage from the rectifier when the output voltage from the rectifier drops to or below a third threshold voltage lower than the predetermined voltage.

According to the present disclosure, when an amount of the power supplied from the rectifier to the load device operating with power supplied from the rectifier is insufficient, the backup power quickly supplies an amount of power corresponding to the insufficient amount of power from the secondary battery to the load device, which enables the load device to continue the operation.

DETAILED DESCRIPTION

A backup power supply 1 according to an embodiment of the present disclosure will be described with reference to FIG. 1. The present invention is not limited to the embodiment described below, and various modifications are possible within the scope of the claims.

Configuration of Backup Power supply

Figure 1:
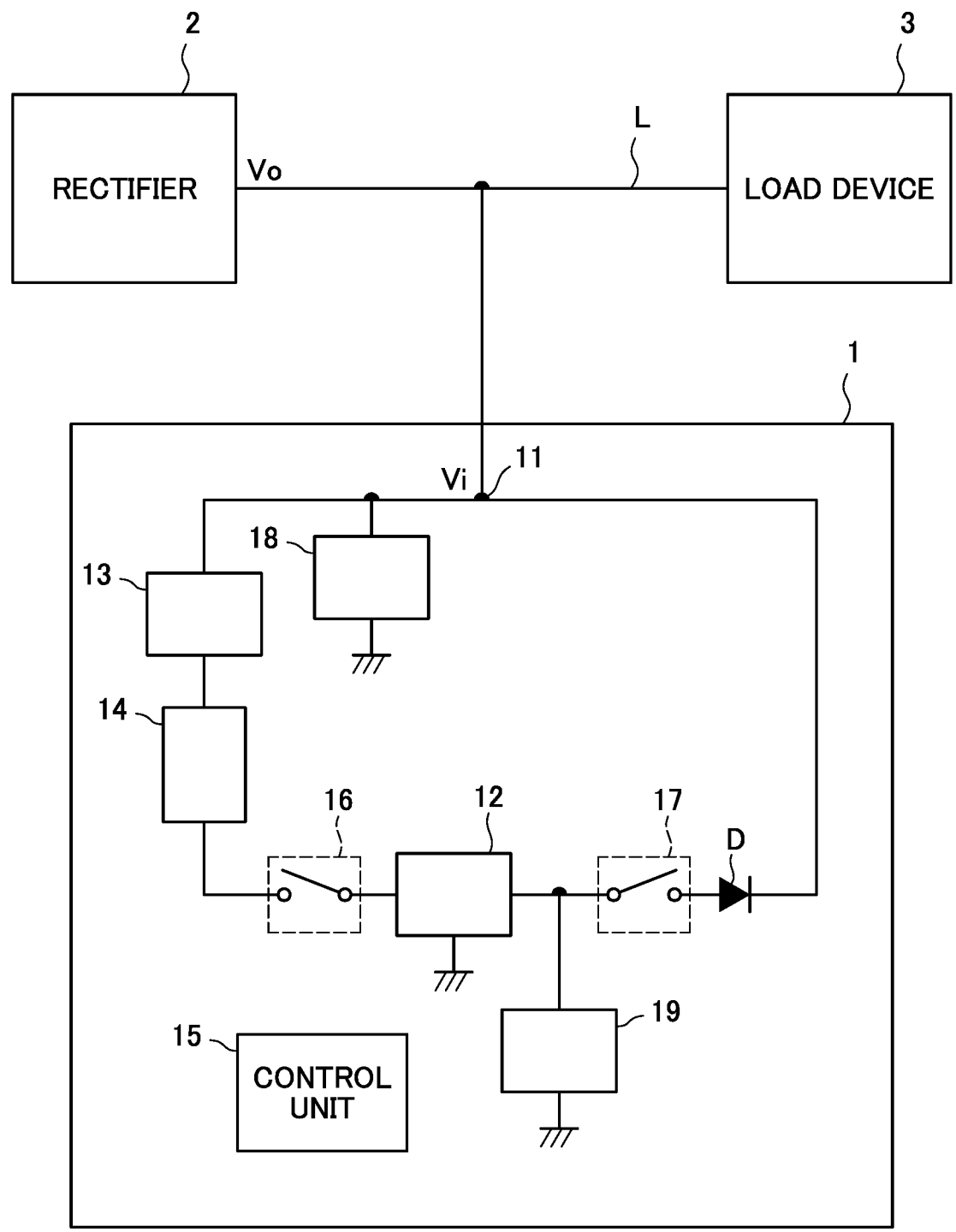
FIG. 1 is a circuit diagram of a backup power supply according to an embodiment.

As shown in FIG. 1, the backup power supply 1 is connected to a power supply line L that electrically connects a rectifier 2 and a load device 3. The rectifier 2 is an AC-DC converter that uses external commercial power to generate and output DC power of a normal voltage $V_0$. In the present embodiment, the voltage $V_0$ is in the range of 26.2 V to 28.8 V. The load device 3 is a device which is supplied with power by the rectifier 2 to operate. In the present embodiment, for example, in the case of a railroad crossing device, the load device 3 is a crossing gate installed at a railroad crossing, and opens and closes a rod attached to the crossing gate according to traveling of trains. The load device 3 has a rated voltage of 24 V.

The backup power supply 1 includes an input/output part 11, a secondary battery 12, a DC-DC converter 13, a constant current control circuit 14, and a control unit 15. The input/output part 11 is connected to the power supply line L through which power is supplied from rectifier 2 to load device 3. When the backup power supply 1 is charged, an output voltage from the rectifier 2 is applied to the input/output part 11. On the other hand, when the backup power supply 1 supplies power to the load device 3 as a backup power supply, a battery voltage $V_b$ of the secondary battery 12 becomes a voltage at the input/output part 11.

The secondary battery 12 includes a plurality of alkaline secondary battery cells connected in series or in parallel. The plurality of alkaline secondary battery cells is nickel-hydrogen secondary battery cells. In the present embodiment, the secondary battery 12 includes twenty alkaline secondary battery cells connected in series, and discharges power of a battery voltage Vb of 20.0 to 28.8 V according to a charge capacity.

The DC-DC converter 13 is a boost type voltage converter for boosting the output voltage $V_0$ of the rectifier 2 to a voltage which enables the secondary battery 12 to be fully charged, and outputs the boosted voltage to the secondary battery 12 via the constant current control circuit 14.

A charging switch 16 for turning on/off charging of the secondary battery 12 is provided between the constant current control circuit 14 and one electrode of the secondary battery 12. Further, a discharging switch 17 for turning on/off discharging of the secondary battery 12 is provided between the other electrode of the secondary battery 12 and the input/output part 11. Note that a diode D is connected between the discharging switch 17 and the input/output part 11. The anode of the diode D is connected to the other electrode of the secondary battery 12, and the cathode of the diode D is connected to the input/output part 11.

The control unit 15 has a microcomputer, and includes an input/output voltage detection unit 18 for detecting a voltage $V_i$ at the input/output part 11, and a battery voltage detection unit 19 for detecting the battery voltage $V_b$ of the secondary battery 12. The control unit 15 controls switching of the charging switch 16 and the discharging switch 17 in accordance with the voltage $V_i$ at the input/output part 11 and the battery voltage $V_b$ of the secondary battery 12. Since the voltage $V_i$ at the input/output part 11 is equal to the output voltage $V_0$ of the rectifier 2, the control unit 15 monitors the voltage $V_i$ at the input/output part 11, which enables the backup power supply 1 to get to know the operation states of the rectifier 2 and the load device 3.

Operation of Backup Power Supply>

Stop of Charging of Backup Power Supply

The operation of the backup power supply 1 will be described with reference to FIGS. 2 to 5.

First, a charging stop operation of the backup power supply 1 will be described with reference to FIG. 2.

Figure 2:
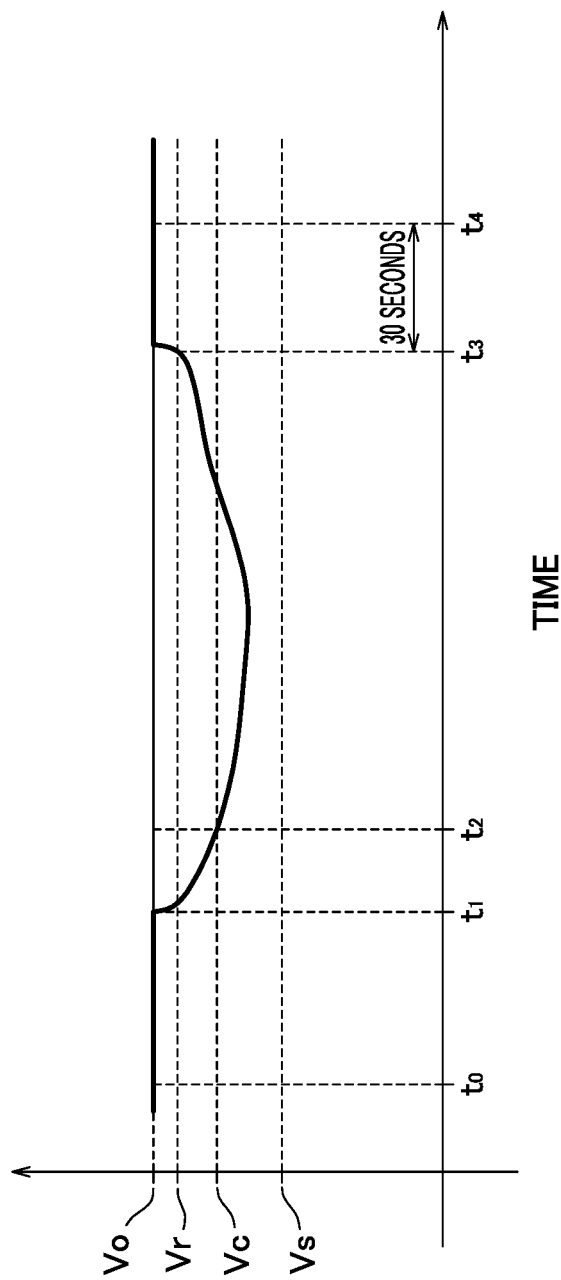
FIG. 2 is a graph showing a time change of the voltage at an input/output part of the backup power supply.

FIG. 2 shows a time change of the voltage $V_i$ at the input/output part 11 of the backup power supply 1. In FIG. 2, the voltage $V_0$ is a voltage value supplied from the rectifier 2 when the rectifier 2 is in a normal operation. The voltage $V_c$ is used by the control unit 15 as a first threshold voltage or a fourth threshold voltage in order to turn off the charging switch 16. The turning off the charging switch 16 stops charging of the secondary battery 12. The voltage $V_s$ is used for the control unit 15 to determine that power supply has been interrupted in the rectifier 2. The voltage $V_s$ is lower than $V_c$. The voltage $V_r$ is used as a reference voltage for resuming charging of the secondary battery 12, which is a second threshold voltage. The voltage $V_r$ is higher than the voltage $V_c$. Both the voltages $V_c$ and $V_s$ are lower than the voltage $V_0$. In the present embodiment, $V_c$ is set to 24 V, $V_s$ is set to 23 V, and $V_r$ is set to 24.5 V.

Referring to FIG. 2, when the rectifier 2 supplies power to the load device 3 at time $t_0$ in a normal manner, the voltage $V_i$ at the input/output part 11 of the backup power supply 1 is equal to the voltage $V_0$. At this time, in the backup power supply 1, the charging switch 16 is turned ON by the control unit 15, so that the secondary battery 12 is charged with the power from the rectifier 2. On the other hand, the control unit 15 turns off the discharging switch 17 so as to prevent the secondary battery 12 from discharging, and is preparation for future discharge.

Next, at time $t_1$, for example, in the case of a railroad crossing device, when the maximum current flow flows through the load device 3 to raise the rod of a crossing gate or the like and then the rectifier 2 is overloaded, the voltage $V_i$ starts to drop. At time $t_2$, when the output voltage of the rectifier 2 drops below $V_c$, the control unit 15 turns off the charging switch 16 to stop charging of the secondary battery 12. However, when the current flowing through the load device 3 returns to normal current after the time $t_2$ because the rod has been fully raised, the voltage $V_i$ turns to increase before voltage $V_i$ drops to the voltage $V_s$. The voltage $V_s$ is used to determine that a power failure occurs in the rectifier 2. The voltage $V_i$ increases until the voltage $V_i$ reaches the voltage $V_r$ at time $t_3$, and eventually returns to the voltage $V_0$. At time $t_4$, for example, when 30 seconds passes after the time $t_3$, the control unit 15 switches on the charging switch 16 to resume charging of the secondary battery 12.

In this way, when the output voltage $V_i$ suddenly drops due to an overload to the rectifier 2, charging of the backup power supply 1 is stopped during the time period from the time $t_2$ to the time $t_4$ in order to increase an amount of power to be supplied to the load device 3. Therefore, the rectifier 2 can supply the power scheduled to be supplied to the backup power supply 1 during the time period from the time $t_2$ to the time $t_4$ to the load device 3. This operation of the backup power supply 1 can resolve the overload state of the rectifier 2 in a short time. In other words, stopping the charging of the backup power supply 1 for a short time can resolve the overload of the rectifier 2, so that the operation of the load device 3 can be continued.

The reason why the charging of the secondary battery 12 is resumed after 30 seconds from the time $t_3$ is to avoid occurrence of a trouble in the rectifier 2. Further, in FIG. 2, the control unit 15 stops charging of the secondary battery 12 when the output voltage of the rectifier 2 drops below $V_c$.

However, in another embodiment, when the output voltage of the rectifier 2 drops below $V_c$, the control unit 15 reduces the amount of current to flow through the secondary battery 12 to charge the secondary battery 12, and the rectifier 2 can supply the amount of power corresponding to the reduced amount to the load device 3.

(2) Discharge of Backup Power Supply

Next, discharge control of the backup power supply 1 will be described with reference to FIGS. 3 to 5.

Figure 3:
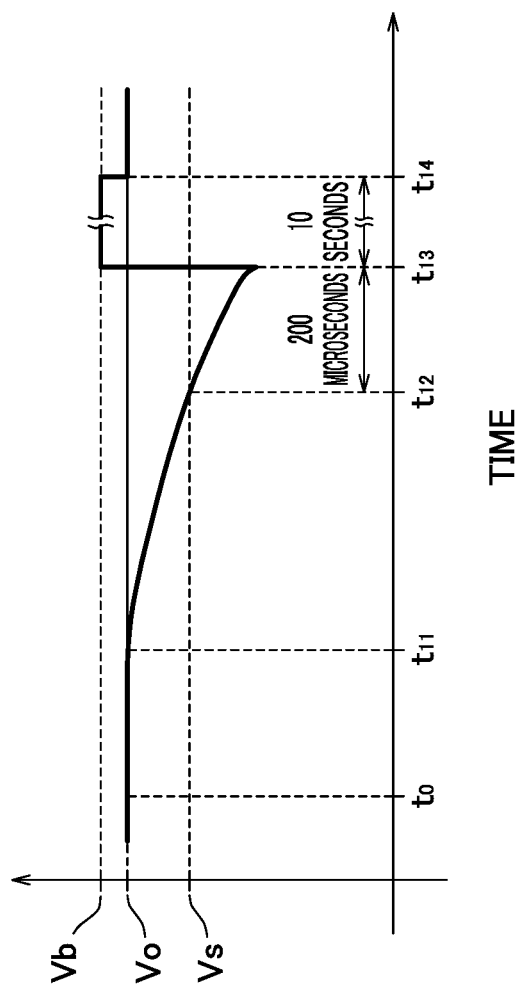
FIG. 3 is a graph showing a time change of the voltage at the input/output part of the backup power supply.

FIG. 3 shows a time change of the voltage $V_i$ at the input/output part 11 of the backup power supply 1. In FIG. 3, the voltage $V_0$ is a voltage output when the rectifier 2 is in a normal operation, and the voltage $V_s$ is a voltage which the control unit 15 uses as a third threshold value to determine whether a power failure occurs in the rectifier 2. The voltage $V_s$ is lower than $V_0$. In the present embodiment, $V_s$ is set to 23 V.

Referring to FIG. 3, when the rectifier 2 normally supplies power to the load device 3 at time $t_0$, the voltage $V_i$ at the input/output part 11 of the backup power supply 1 is equal to the voltage $V_0$. At this time, in the backup power supply 1, the control unit 15 turns on the charging switch 16, thereby charging the secondary battery 12 with the power from the rectifier 2. On the other hand, the control unit 15 turns off the discharging switch 17 so as to prevent the secondary battery 12 from discharging to the load device 3. The secondary battery 12 is in preparation for future discharge.

Next, at time $t_{11}$, for example, in the case of a railroad crossing device, when the maximum current flows through the load device 3 to raise the rod of a crossing gate or the like and causes the rectifier 2 to be subject to overload, the voltage $V_i$ starts to drop. When the voltage $V_i$ further drops to the voltage $V_s$ at time $t_{12}$, the control unit 15 determines that a power failure has occurred in the rectifier 2. And at time $t_{13}$ after 200 microseconds from time $t_{12}$, the control unit 15 confirms that the battery voltage $V_b$ of the secondary battery 12 is higher than $V_i$, and then switches the discharging switch 17 from OFF to ON to start discharging of the secondary battery 12. Consequently, the backup power supply 1 starts supplying power to the load device 3. In other words, the backup power supply 1 discharges the secondary battery 12 for 10 seconds from the time $t_{13}$ to the time $t_{14}$ to supply power to the load device 3. Therefore, the voltage $V_i$ at the input/output part 11 becomes equal to the battery voltage $V_b$ of the secondary battery 12 for 10 seconds from the time $t_{13}$ to the time $t_{14}$.

At the time $t_{14}$, the control unit 15 turns off the discharging switch 17 to detect the output voltage of the rectifier 2. If the output voltage $V_0$ of the rectifier 2 at the time $t_{14}$ has returned to $V_0$, the control unit 15 maintains the discharging switch 17 in an OFF-state to stop discharging from the secondary battery 12 after the time $t_{14}$.

Therefore, power is not suppled from the backup power supply 1 to the load device 3, and the input to the load device 3 is only the power from the rectifier 2. Therefore, the voltage $V_i$ at the input/output part 11 is equal to the output voltage $V_0$ of the rectifier 2.

In this way, when the rectifier 2 is subject to an overload during the time period from the time $t_{11}$ to the time $t_{14}$, the backup power supply 1 supplies power to the load device 3 during the time period from the time $t_{13}$ to the time $t_{14}$ to compensate for the shortage of power from the rectifier 2 to the load device 3. Accordingly, the operation of the load device 3 can be maintained.

Figure 4:
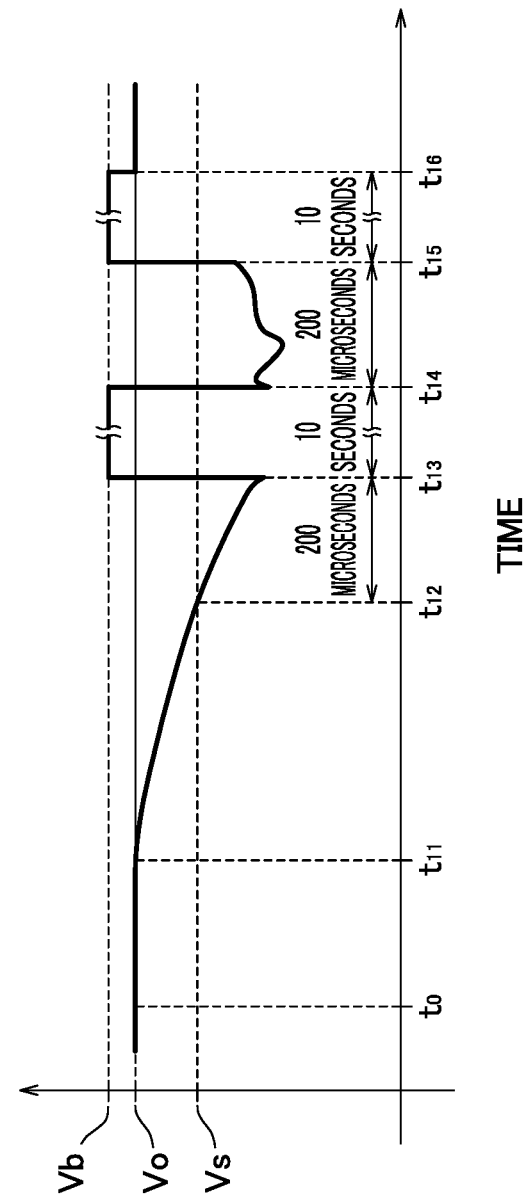
FIG. 4 is a graph showing a time change of the voltage at the input/output part of the backup power supply.

On the other hand, as shown in FIG. 4, when the detected output power of the rectifier 2 is still equal to or less than the voltage $V_s$ at time $t_{14}$, the control unit 15 confirms that the battery voltage $V_b$ is higher than the voltage $V_i$ at time $t_{15}$ after 200 microseconds elapsed from the time $t_{14}$, and then switches the discharging switch 17 from OFF to ON to start discharging of the secondary battery 12, thereby resuming power supply from the secondary battery 12 to the load device 3. Therefore, the backup power supply 1 supplies power to the load device 3 by discharging the secondary battery 12 for 10 seconds from the time $t_{15}$ to time $t_{16}$. As a result, the voltage $V_i$ at the input/output part 11 is equal to the battery voltage $V_b$ of the secondary battery 12 for 10 seconds from the time $t_{15}$ to the time $t_{16}$.

At the time $t_{16}$, the control unit 15 turns off the discharging switch 17 to detect the output voltage of the rectifier 2. If the output voltage of the rectifier 2 at the time $t_{16}$ has returned to $V_0$, the control unit 15 continues the OFF-state of the discharging switch 17 to stop discharging from the secondary battery 12 after the time $t_{16}$.

Therefore, the backup power supply 1 does not supply power to the load device 3, and the load device 3 receives only the power from the rectifier 2, so that the voltage $V_i$ at the input/output part 11 is equal to the output voltage $V_0$ of the rectifier 2.

In this way, when the overload condition of the rectifier 2 is not improved even by power supply from the backup power supply 1 to the load device 3 for the first 10 seconds, the time period of power supply from the backup power supply 1 is extended, whereby the operation of the load device 3 can be maintained.

Figure 5:
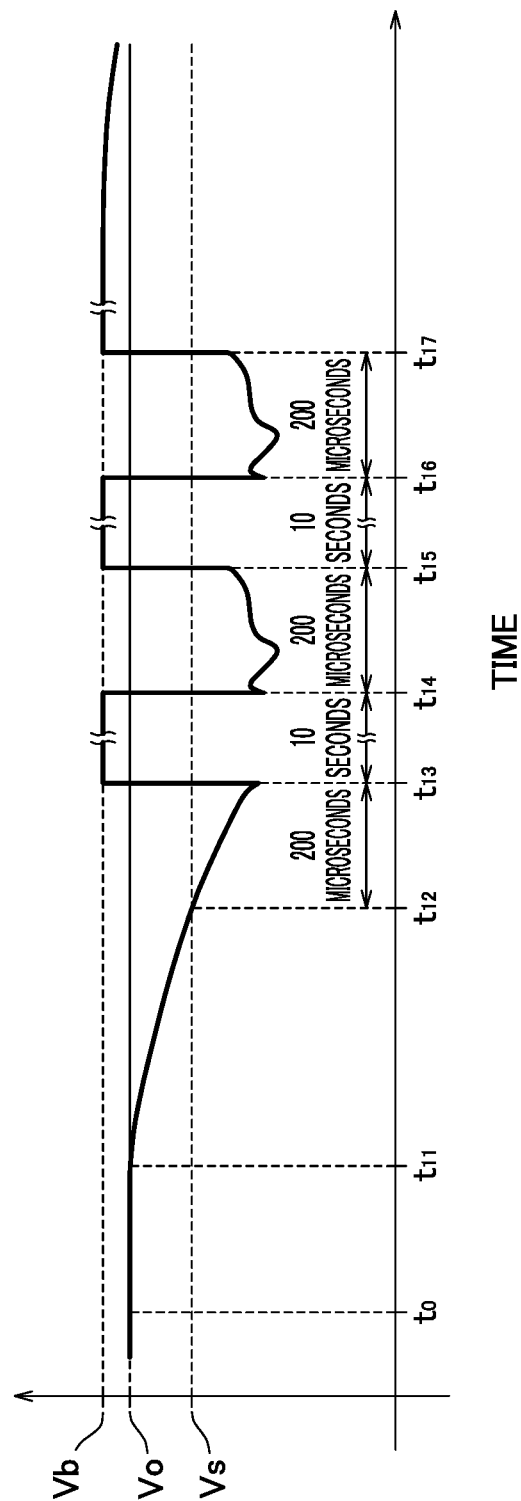
FIG. 5 is a graph showing a time change of the voltage at the input/output part of the backup power supply.

On the other hand, as shown in FIG. 5, when the control unit 15 detects that the output power of the rectifier 2 is still equal to or less than the voltage $V_s$ at time $t_{16}$, the control unit 15 determines that a fault which cannot be normally restored within several tens of seconds has occurred in the rectifier 2 and/or the load device 3. The control unit 15 then switches the discharging switch 17 from OFF to ON to resume discharging from the secondary battery 12 at time $t_{17}$ after 200 microseconds elapsed from the time $t_{16}$, thereby supplying power from the backup power supply 1 to the load device 3. In this state, the period for which the voltage at the input/output part 11 is equal to or less than $V_s$ is as long as 20 seconds or more. Therefore, after the time $t_{17}$, the backup power supply 1 continues the power supply from the load device 3 until the voltage $V_i$ at the input/output part 11 exceeds the battery voltage $V_b$. Accordingly, it is possible to continue the operation of the load device 3 despite long-term drop of the output voltage of the rectifier.

The voltage $V_i$ at the input/output part 11 after the time $t_{17}$ becomes equal to the battery voltage $V_b$ of the secondary battery 12.

While power is supplied from the backup power supply 1 to the load device 3, the charging of the secondary battery 12 in the backup power supply 1 by the power of the rectifier 2 may be stopped, and the power to be used for charging of the backup power supply 1 may also be supplied to the load device 3.

In this way, when an overload condition occurs in the rectifier 2, the charging of the backup power supply 1 is stopped. And all the power supplied from the rectifier 2 is supplied to the load device 3, so that the operation of the load device 3 can be continued. When the output voltage of the rectifier 2 further drops, power is also supplied from the backup power supply 1 to the load device 3 to compensate for the power shortage of the load device 3 and maintain the operation of the load device 3.

EXPLANATION OF REFERENCE SIGNS 1 backup power supply
2 rectifier
3 load device
12 secondary battery
15 control unit
18 input/output voltage detection unit
19 battery voltage detection unit

The invention claimed is:

1. A backup power supply charged by a rectifier for suppling power to a load device, the load device being operated with power supplied from the rectifier outputting power of a predetermined voltage, and the backup power supply supplying power to the load device when the power supplied from the rectifier to the load device is insufficient, the backup power supply comprising:
   a secondary battery configured to be charged with power from the rectifier;
   a control unit configured to control charging and discharging of the secondary battery; and
   an output voltage detection unit configured to detect an output voltage from the rectifier,
   wherein the control unit is configured to:
      control charging the backup power supply by the rectifier; and
      stop charging of the backup power supply when the output voltage from the rectifier drops to or below a charge cutoff threshold voltage lower than the predetermined voltage but higher than a discharge threshold voltage lower than the charge cutoff voltage.

2. The backup power supply according to claim 1, wherein the control unit is configured to continue stopping charging of the secondary battery until the output voltage dropped to or under the charge cutoff threshold voltage increases to a charge resumption threshold voltage higher than the charge cutoff threshold voltage and lower than the predetermined voltage.

3. A backup power supply charged by a rectifier for suppling power to a load device, the load device being operated with power supplied from the rectifier outputting power of a predetermined voltage, and the backup power supply supplying power to the load device when the power supplied from the rectifier to the load device is insufficient, the backup power supply comprising:
   a secondary battery configured to be charged with power from the rectifier;
   a control unit configured to control charging and discharging of the secondary battery;
   an output voltage detection unit for detecting an output voltage from the rectifier; and
   a battery voltage detection unit for detecting a battery voltage across the secondary battery,
   wherein:
      the backup power supply is configured to be charged by the rectifier; and
      the control unit is configured to stop charging of the backup power supply when the output voltage from the rectifier drops to or below a charge cutoff threshold voltage lower than the predetermined voltage but higher than a discharge threshold voltage lower than the charge cutoff voltage.

4. The backup power supply according to claim 3, wherein:
   the control unit is configured to allow the secondary battery to discharge to the load device during a first time period after the output voltage drops to or below the discharge threshold voltage and the battery voltage;
   the control unit is configured to stop discharge from the secondary battery to the load device when the output voltage returns to the predetermined voltage after elapse of the first time period; and
   the control unit is configured such that, when the output voltage after the elapse of the first time period is lower than the discharge threshold voltage and the output voltage is lower than the battery voltage, the control unit allows the secondary battery to discharge to the load device during a second time period, and
   when the output voltage returns to the predetermined voltage after elapse of the second time period, the control unit stops discharge from the secondary battery to the load device.

5. The backup power supply according to claim 4, wherein when the output voltage after elapse of the second time period is lower than the discharge threshold voltage, the control unit allows the secondary battery to discharge to the load device, and continues discharging from the secondary battery to the load device until the battery voltage drops to or under the output voltage.

6. The backup power supply according to claim 3, wherein when the output voltage drops to or under the charge cutoff threshold voltage, the control unit stops charging of the secondary battery and continues stopping charging of the second battery until the output voltage returns to the predetermined voltage.

7. A method for controlling a backup power supply for suppling power to a load device, the load device being operated with power supplied from a rectifier outputting power of a predetermined voltage, and the backup power supply supplying power to the load device when the power supplied from the rectifier to the load device is insufficient as determined by an output voltage from the rectifier dropping to or below a discharge threshold voltage, the method comprising:
   charging the backup power supply by the rectifier; and
   stopping charging of the backup power supply when the output voltage from the rectifier drops to or below a charge cutoff threshold voltage lower than the predetermined voltage but higher than the discharge threshold voltage.

8. The method according to claim 7, further comprising: continuing stopping charging of the backup power supply until the output voltage increases to a charge resumption threshold voltage higher than the charge cutoff threshold voltage and lower than the predetermined voltage after the stopping charging.

9. A method for controlling a backup power supply charged by a rectifier for supplying power to a load device, the load device being operated with power supplied from the rectifier, and the backup power supply supplying power when the power supplied from the rectifier to the load device is insufficient, the rectifier outputting power of a predetermined voltage, the method comprising:
   charging the backup power supply only while an output voltage of the rectifier exceeds a charge cutoff threshold voltage less than the predetermined voltage; and supplying power from the backup power supply to the load device during a first time period, when the output voltage of the rectifier drops to or below a discharge threshold voltage lower than the charge cutoff threshold voltage and an output voltage of the backup power supply is higher than the output voltage of the rectifier.

10. The method according to claim 9, further comprising: supplying power from the backup power supply to the load device during a second time period when the output voltage of the rectifier is lower than the discharge threshold voltage and lower than the output voltage of the backup power supply after the supplying power during the first time period.

* * * * *